(12) United States Patent
Kirby

(10) Patent No.: US 6,327,638 B1
(45) Date of Patent: Dec. 4, 2001

(54) DISK STRIPING METHOD AND STORAGE SUBSYSTEM USING SAME

(75) Inventor: J. W. Kirby, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/108,082

(22) Filed: Jun. 30, 1998

(51) Int. Cl.[7] .................................................. G06F 12/00
(52) U.S. Cl. ............................................................ 711/4
(58) Field of Search ................................................ 711/4

(56) References Cited

U.S. PATENT DOCUMENTS 5,724,539 * 3/1998 Riggle et al. ......................... 711/100

* cited by examiner

Primary Examiner—Jack A. Lane

(57) ABSTRACT

Methods and systems for mapping logical disk addresses to physical locations so as to achieve consistent sustained performance for a striped disk array I/O subsystem. Stripes (regions) are defined by a region mapping table. Zones are defined by the disk manufacturer as groups of cylinders having identical number of sectors per track. Outer zones store more data and therefore provide a higher level of sustained performance as compared to inner zones. Substantially half the disks in the array are mapped such that logical sequential blocks are allocated from outer most, higher performance, zones to inner, lower performance, zones. The other half of the drives in the array are mapped from inner zones to outer zones. Each region (stripe) therefore includes a mix of higher performance zones and lower performance zones. Each region therefore provides more consistent sustained performance as compared to prior techniques. Improved consistency in performance enables better utilization of storage system performance and storage capacity as compared to prior techniques. Alternate embodiments of the invention provide for striping such regions using multiple actuators within a single drive spindle and for providing such mapping functions within low level drive control electronics.

19 Claims, 7 Drawing Sheets

DISK STRIPING METHOD AND STORAGE SUBSYSTEM USING SAME

BACKGROUND OF THE INVENTION

1. Field of the Invention

This invention relates to data storage subsystems and, more particularly, to a disk striping method operable within a storage subsystem for improving both performance and storage capacity utilization.

2. Discussion of Related Art

Storage systems provide persistent storage of information for computer systems. These storage systems often integrate a number of data storage devices (e.g., tape drives, compact disks and hard disk drives) to store data and make it accessible to a computer system. Storage capacity requirements and performance requirements are ever increasing. For example, so-called multi-media computer applications require storage of vast quantities of audio and video data. Further, such applications often require high performance levels for the storage subsystems. For example, the capture of video data for storage on a disk storage subsystem often requires very high data transfer rates to store the captured data and requires that such high data transfer rates be sustained for extended periods of time. Where the volume of such data increases and reliance on computer systems to store and manipulate such data increases, disk performance and disk utilization are constant and continuing challenges.

A recording surface of a hard disk drive (disk) consists of a series of concentric tracks on a recording surface. The medium for recording the information is typically magnetic or optical. Modem disks typically have multiple such surfaces upon which data can be written or read. Each surface is served by an electronic read/write head and associated read/write channel. The read/write head and channel circuits encodes data, writes the encoded information by storing signals on the recording surface, and reads previously stored information. identically positioned tracks (radially speaking) on multiple surfaces accessed by multiple read/write (r/w) heads are often referred to as cylinders.

Each track is subdivided into a plurality of equally, generally fixed, sized sectors. Each sector is capable of storing a block of data for subsequent retrieval. In a concentric track layout, the radially outermost track/cylinder has a larger circumference as compared to radially inner tracks. The outermost track is therefore potentially capable of storing the data as compared to the inner tracks. In other words, the larger circumference of outer tracks typically comprises more fixed sized sectors than do inner tracks.

Computers accessing a storage subsystem usually access the storage in fixed sized units. A sector or block is generally the smallest such unit of access by a computer. However, for higher performance applications, it is common to access the storage devices in much larger, yet equal and generally fixed sized, groupings of blocks. High performance application access larger quanta of storage space in each I/O read or write request so as to amortize the I/O processing overhead over a larger number of data units transferred. This helps achieve higher overall throughput by reducing the amount of overhead processing as compared actual data transfer processing. For example, high performance applications might assure that each I/O request that accesses the storage subsystem is at least a full track or a full cylinder, or multiples of tracks or cylinders.

As noted above, inner portions of the disk may provide slower performance than outer portions due to physical geometry and storage density of the disks. Outer portions (tracks and cylinders) of disk drives store more sectors than inner portions due to their larger circumference. Disk drive manufacturers generally group tracks/cylinders having the same number of sectors into zones. A zone is therefore a grouping of like sized tracks/cylinders in a disk drive. Outer zones therefore have more sectors per track (SPT) as compared to inner zones. The number of tracks/cylinders in each zone is dependent upon a number of design factors considered by disk drive manufacturers. A disk manufacturer therefore provides a disk layout that identifies the specific zone configuration of a particular disk.

Outer zones generally provide better performance than inner zones for two reasons. First, since tracks/cylinders in the outer zones have more sectors per track as compared to those in inner zones, more data is transferred from a single rotation of the disk surface. Tracks in the outer zones therefore have an inherently higher transfer rate over a single rotation of the disk recording surface. Second, since each outer zone track/cylinder stores more data than inner zone tracks/cylinders, the read/write head associated with each surface of the disk need not be moved as frequently to sustain a particular data transfer rate. As a large data transfer proceeds from track to track (cylinder to cylinder) over the surface of a disk, the disk read/write head is moved to re-position over each subsequent track/cylinder of a disk. Large transfers to or from tracks in outer zones can therefore sustain a higher transfer rate than transfer to or from tracks in inner zones. The zone's performance is therefore a measure of its sustainable transfer rate which is in part, a function of it radial placement on the disk drives (i.e., inner zones provide lower sustained performance than outer zones).

Disk striping is a technique used to enhance disk transfer performance. Striping distributes data in stripes across a plurality of disks. On each disk, data is mapped and stored in predefined blocks generally having a fixed size. A predefined number of blocks of data from each disk are mapped to define a stripe of data. Stripes are allocated across portions of each of the disk drives used for the striping. Each such portion is referred to herein as a segment. For example, a stripe will consist of N segments, where N is the number of disk drives used for striping. Striping improves overall performance of a storage subsystem by defining the stripe as parallel blocks of data across the disks. The total time required to process a large I/O transfer is then divided up (approximately) by the number of drives used for the stripe. For example, a transfer of X blocks to a single disk drive may require T seconds. The same transfer of X blocks striped over N drives would therefore complete in (approximately) X/N seconds.

Disk striping is particularly effective to improve storage subsystem performance for applications depending on large I/O transfers. For example, applications such as real time image capture of other high speed data acquisition require high data transfer capacity. Striping improves performance by spreading large I/O operations over a plurality of disk drives. Rather than waiting for a single disk drive to process all data in a large I/O request, each of a plurality of disks processes a smaller portion of the data in the large I/O request in parallel with other disk drives.

Striping is a common technique in, for example, RAID storage subsystems. Data in many RAID (Redundant Array of Inexpensive Disks) is striped over a number of disk drives—the disk array. Although striping of multiple disks enhances performance, it diminishes reliability. Striping diminishes reliability because failure of any one of the disks is equivalent to the failure of the entire array. RAID system are designed to enhance reliability, especially that which is lost by use of striping techniques. RAID systems employ many techniques to enhance reliability of stored information. One such technique is the use of mirroring to enhance the reliability of disk storage devices. Other RAID techniques use parity (i.e., Boolean exclusive-OR computed values) or other techniques to provide redundancy information capable of regenerating data lost due to a disk drive failure. In general, RAID systems use striping to increase performance and use redundancy (mirroring as well as other redundancy techniques) to assure reliable storage of data on the disk drives.

As noted above, sustained performance of an individual disk may vary in accordance with the location of the zones used for large transfers. In like manner, disk array performance (i.e., RAID subsystem performance) may vary depending upon the location of zones used for a particular transfer. Disk arrays are often rated for performance in accordance with their maximum performance (as experienced in outer zones) or their average performance which is an average sustained transfer rate over all zones. This average performance includes the minimum performance (as experienced in inner zones). However, many applications require that the array performance be maintained above a minimum level to sustain anticipated data transfers of the application. For example, real time image capture or high speed data acquisition must store captured data as quickly as it is generated or risk loss of data.

A typical solution in accordance with present techniques is to design or specify the storage subsystem for an application based upon the minimum performance of the subsystem rather than the average sustained rate. Therefore, many applications must use the minimum sustained performance of a disk array. Such applications may be wasting the higher performance capability of the array where outer zones happen to be in use but must do so to sustain a minimum performance level experienced within inner zones.

The performance of the inner zones, the minimum performance level, is therefore critical to many applications. Using a larger number of disks in the array, thereby spreading the performance bandwidth over still more parallel operating disks can increase the minimum performance level. However, such solutions may be wasteful of storage capacity where the size of individual disk drives cannot be effectively tailored to meet the requirements of the application. In other words, adding more disk drives merely to enhance performance may add more capacity than is required for the application.

It is evident from the foregoing description that a need exists for a disk striping method to improve both performance and storage capacity utilization of storage subsystems.

SUMMARY OF THE INVENTION

The present invention solves the above and other problems, thereby advancing the useful arts, by providing a disk striping method within a storage subsystem for improving both performance and storage capacity utilization. The present invention uses methods to assure substantially constant performance across all zones when transferring data to or from disk. In general the present invention stripes data over a plurality of disks such that half the disks map sequential block addresses so as to allocate space from outer to inner zones and the other half maps addresses from inner to outer zones. Where, for example, half the data in a stripe is manipulated on faster outer zones, the other half is manipulated on correspondingly slower inner zones. Or, for example, where half the data in a stripe is manipulated on "middle" zones (intermediate the innermost and outmost zones), the other half of the data is also manipulated in a middle zones thereby also achieving more consistent "average" sustained performance.

This mapping method and structure of the present invention helps assure that all stripes provide approximately equal performance, namely the average sustained performance of the storage subsystem. In this manner the average sustained performance of the subsystem may be relied upon for high performance storage applications (such as image capture or other data acquisition applications). For a given disk array, the average performance may be presumed in matching storage performance specifications to the needs of an application. This, as compared to prior techniques where the minimum performance of inner zone tracks/cylinders had to be used to match storage system performance with needs of an application.

The present invention therefore better utilizes available storage capacity and I/O performance obviating the need to add more disk drives than needed or to apply a higher performance disk array than necessary for a given application. The performance of the disk array, in accordance with the present invention, may be more closely matched to the needs to the application utilizing it.

It is therefore an object of the present invention to provide methods and associated structures for mapping striped data within a storage subsystem for improving both disk performance and disk utilization.

It is a further object of the present invention to provide methods and associated structures for mapping striped data within a storage subsystem for improving both disk performance and disk utilization by distributing the data in a stripe over some outer zones and some inner zones.

It is therefore an object of the present invention to provide methods and associated structures for mapping striped data within a storage subsystem for improving both disk performance and disk utilization by assuring that all stripes in the storage subsystem are capable of sustaining approximately average performance of the inner and outer zones of the disks.

It is therefore an object of the present invention to provide methods and associated structures for mapping striped data within a disk array storage subsystem for improving both disk performance and disk utilization by mapping sequential blocks on half the disks in the array from innermost to outermost zones and on half the disks in the array from outermost to innermost zones.

The above and other objects, features, and advantages of the present invention will become apparent from the following description and the attached drawing.

DETAILED DESCRIPTION OF THE PREFERRED EMBODIMENTS

Figure 1:
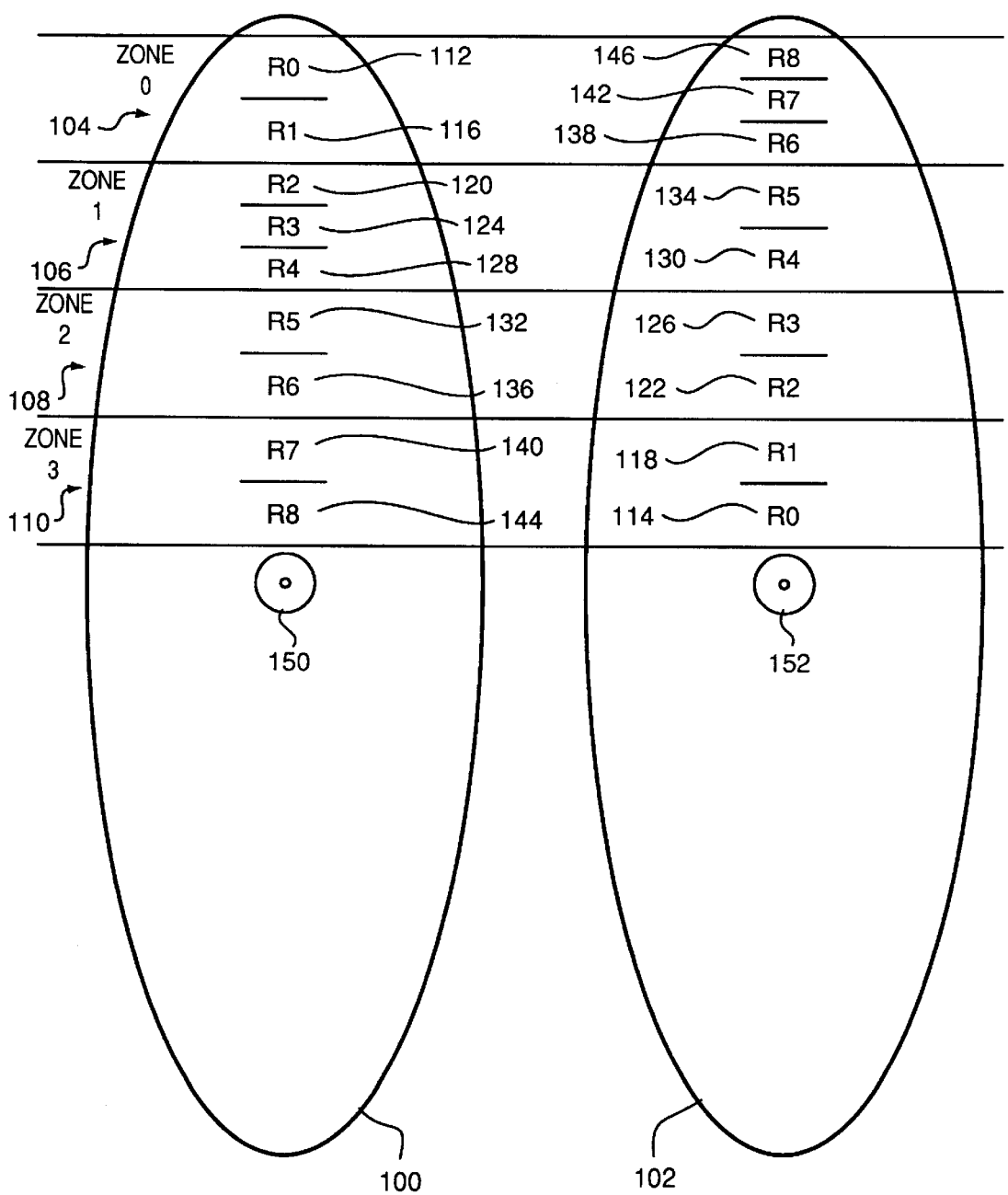
FIG. 1 is a block diagram of an exemplary region and zone mapping on two disk drives in accordance with the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 2:
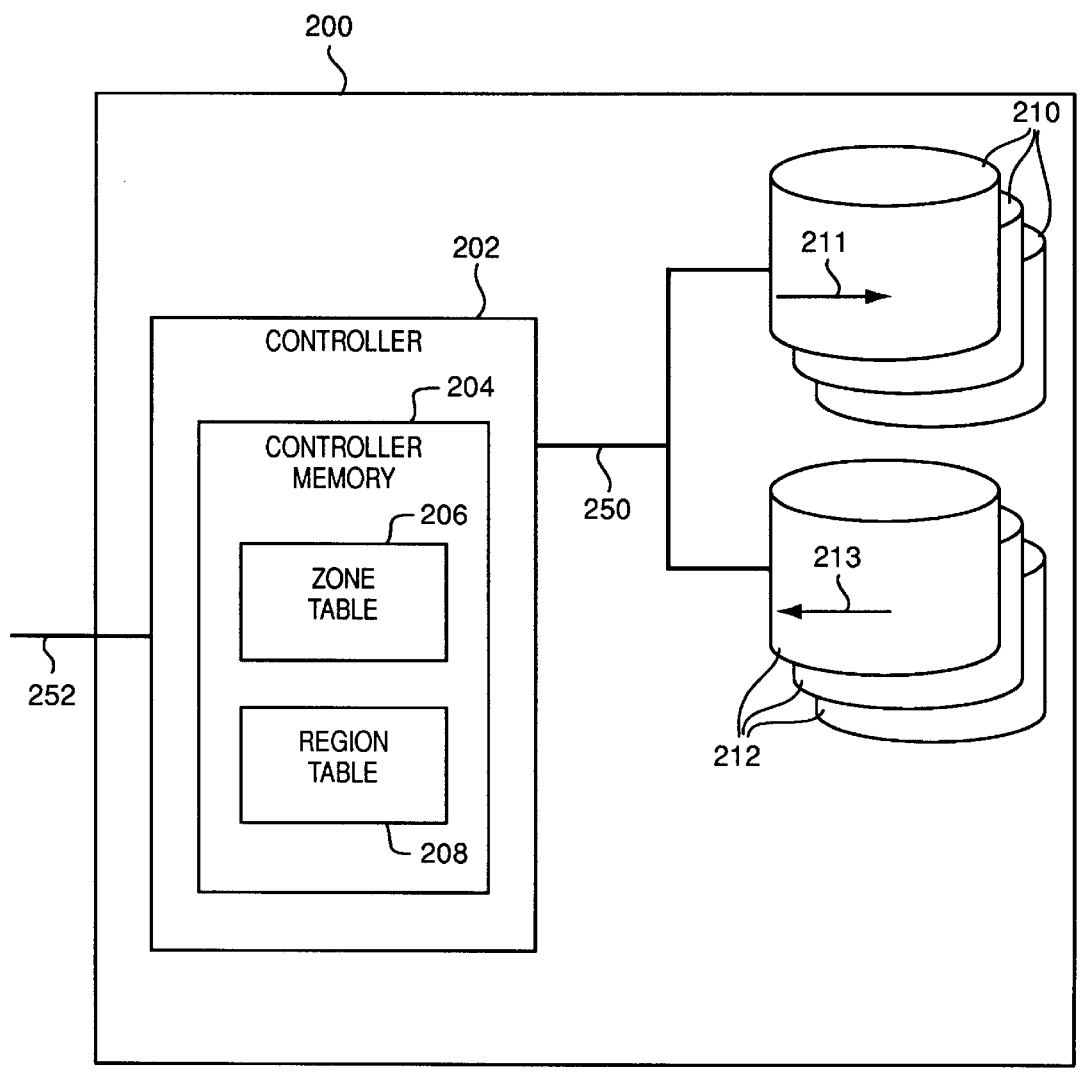
FIG. 2 is a block diagram of a storage system operable in accordance with the present invention to map substantially half the drives in a first direction and the other half in a second direction.

FIG. 2 is a block diagram depicting a storage system operable in accordance with the present invention. Storage system 200 includes controller 202 which manages the storage and retrieval of data on disk drives 210 and 212 in response to requests by attached host systems (not shown). Controller 202 includes controller memory 204 in which, among the other things, zone table 206 and region table 208 reside in accordance with the present invention. Controller 202 exchanges data and commands with disk drives 210 and 212 via interface bus 250. Those skilled in the art will readily recognize that the interface 250 between controller 202 and disk drives 210 and 212 may be any of several well-known interfaces and buses utilized in the industry. For example, bus 250 may be a parallel SCSI bus, Fibre Channel, EIDE, etc. In the preferred embodiment, controller 202 is housed within storage system 200 and exchanges commands and data with attached host systems (not shown) via bus 252. Bus 252 may be any of several commercially available interface buses or media including, for example, parallel SCSI bus, Fibre Channel, etc. Those skilled in the art will further recognize the equivalency of embedding controller 202 within the host systems (not shown) rather than within the storage subsystem 200.

In accordance with the present invention, and as discussed further herein below, data manipulated on disk drives 210 are stored in sequential locations from outer zones through inner zones as indicated by radial inward arrow 211. Similarly, data manipulated on disk drives 212 are stored and retrieved in sequential locations from inner zones through outer zones as signified by radial outward arrow 213. Controller 202 manages this mapping of information on disk drives 210 and 212 using zone table 206 and region table 208 in accordance with the present invention.

ZONES AND REGIONS

FIG. 1 is a schematic representation of the recording surface of two disk drives 100 and 102. Tracks or cylinders recorded on the recording surface of disks 100 and 102 extend in concentric circles outward from rotating spindle hubs 150 and 152 respectively. As shown in FIG. 1, and outer most zone 0 104 is shown at the radially outer most positions of disk drives 100 and 102. The next radially inward zone 1 106, followed by the next zone 2 108, and the last zone 3 110 are also shown in FIG. 1. Zone 0 104 is herein referred to as the outer most zone. In like manner, zone at 3 110 is referred to herein as the inner most zone.

As noted herein above, inner zones are comprised of tracks or cylinders disposed radially inward (closer to spindle hubs 150 and 152 of disks 100 and 102, respectively). Conversely, outer zones are comprised of tracks or cylinders positioned radially outward from the spindle hubs of the disk drives. Inner tracks or cylinders store less information as compared to outer tracks because of their lesser circumference as compared to outer tracks and cylinders. A zone is therefore defined as a group of tracks or cylinders on a disk drive which store an identical number of sectors in each track or cylinder. Tables of such zone information (referred to herein as zone table or zone map) are typically provided by manufacturers of each particular disk drive. Where such information is not directly provided in tabular form by a disk drive manufacturer, such information is generally readily available such that the methods and systems of the present invention may derive or otherwise generate an appropriate zone map for use in accordance with the present invention.

The following zone table is such a manufacturer provided table produced by the Seagate Corp. for a Cheetah model ST34501 disk drive (a disk having 6581 cylinders distributed into 7 zones). This particular table is provided herein merely as an example of one such table provided by this specific drive manufacturer for one specific drive. The present invention is clearly not limited to disk drives whose zone information corresponds to the table provided herein below. Rather, the present invention encompasses systems and methods operable on a wide variety of disk drives for which zone information is available or may be derived.

TABLE 1

(exemplary zone table)

| zone | start cyl | end cyl | tot cyls | freq | SPT | Xfer rate MB/sec | Cap MB | % Cap |
|---|---|---|---|---|---|---|---|---|
| 0 | 0 | 1301 | 1302 | 177 | 195 | 16.64 | 1039.9 | 22.85 |
| 1 | 1303 | 2448 | 1146 | 169 | 185 | 15.79 | 868.4 | 19.08 |
| 2 | 2450 | 3499 | 1050 | 160 | 176 | 15.02 | 756.9 | 16.63 |
| 3 | 3501 | 4400 | 900 | 151 | 164 | 13.99 | 604.6 | 13.28 |
| 4 | 4402 | 5217 | 816 | 141 | 153 | 13.06 | 511.4 | 11.24 |
| 5 | 5219 | 5950 | 732 | 133 | 144 | 12.29 | 431.8 | 9.49 |
| 6 | 5952 | 6581 | 630 | 122 | 131 | 11.18 | 333.0 | 7.43 |

Also shown in FIG. 1 are exemplary regions logically mapped to the physical zones 104 through 110 on disk drives 100 and 102. In particular, exemplary regions R0 through R8 are mapped on disk drive 100 such that the first zone R0 112 is positioned at the outer most extent of the outer most zone 0 104. Inner most zone R8 144 is conversely mapped to be inner most positions of the inner most zone 3 110. Intermediate regions R1 through R7 are logically mapped to intermediate positions between inner most region R8 144 and outer most region R0 112.

In contrast to disk 100, disk 102 has inner most region R0 114 logically mapped to the inner most portion of inner most zone 3 110 . Outer most region R8 146 is logically mapped to the outer most portion of outer most zone 0 104 of disk 102. Intermediate regions R1 through R7 are logically mapped to positions intermediate the inner most and outer most regions.

As discussed further herein below, sequential locations written by a controller to disk drives 100 and 102 are written in a striped manner such that data is written to corresponding regions of both disk drives. Specifically, for example, data written to first sequential locations of the storage system including disks 100 and 102 is written to region R0 112 and region R0 114 of disk drives 100 and 102, respectively. Further sequential locations are written to region R1 116 and region R1 118 of disks 100 and 102 respectively, thence region R2 120 and region R2 122, etc.

Such mapping of regions to the physical zones of the disk drives provides for use outer zones in correspondence with inner zones to achieve substantially constant I/O performance in the storage subsystem. In other words, data written to region R0 of the storage subsystem of FIG. 1 utilizes higher performance outer most zone 0 104 of disk 100 in combination with lower performance inner most zone 3 110 of disk 102 to thereby achieve average performance in sustained data transfer. At the opposite extreme, data written to region R8 of the storage subsystem of FIG. 1 utilizes inner most zone 3 110 of disk 100 and outer most zone 0 104 of disk 102 to thereby achieve substantially average sustained data transfer performance. In like manner intermediate regions utilize corresponding regions on disk drives 100 and 102 to also achieve substantially average sustained data transfer performance. For example, regions R3 (124 on disk 100 and 126 on disk 102) utilizes zone 1 106 on disk 100 and zone 2 108 on disk 102. Those skilled in the art will recognize that corresponding regions as schematically represented in FIG. 1 will achieve substantially average and consistent performance over all regions by utilizing corresponding inner and outer zones of the disk drives.

It will further be noted as schematically represented in FIG. 1 that no region 112 through 146 crosses a boundary between zones 104 through 110. In other words, a region is wholly contained within a single zone. This preferred embodiment permits simpler definitions of regions to enable rapid table lookup techniques to be used for mapping I/O requests into specific regions and physical zones of the disk drives. Those skilled in the art will recognize that this restriction, though preferred in the presently known best mode, is not a requirement of the methods and systems of the present invention. Rather, regions may be mapped to zones of the disk drives in such a manner as to ignore zone boundaries. For example, it may be desirable in certain applications for all regions to be identical in size. Though such a goal may be achieved in certain physical zone layouts of particular disk drives, such a goal may not be universally achievable on all disk drives. If it is important in a particular application to allocate regions in a uniform size, it may be required in such applications that regions be allowed to overlap to different zones.

Figure 7:
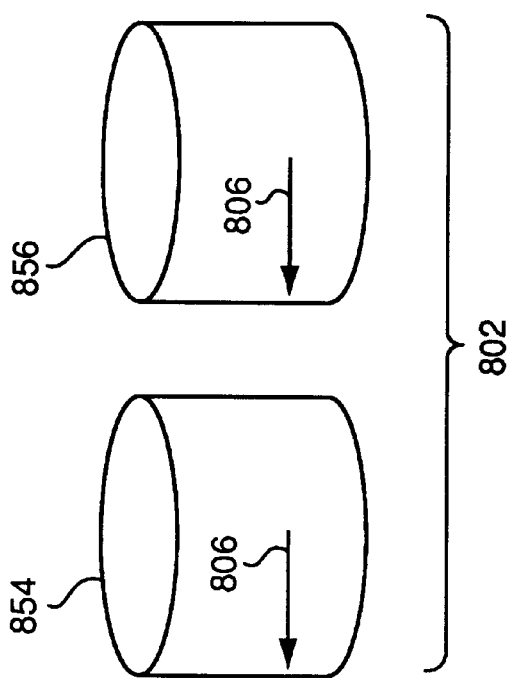
FIG. 7 is a block diagram of a four disk array mapped in two portions of a first type and a second type in accordance with the present invention.
Figure 7:
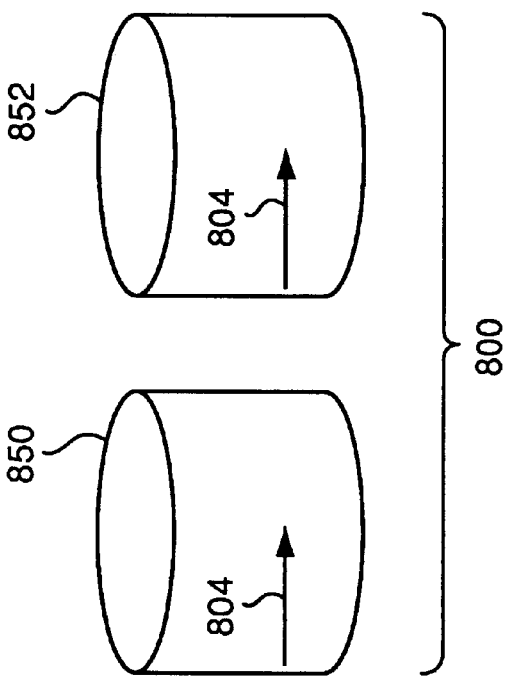

In the preferred embodiment, disk drives are mapped in pairs as noted above. A first disk of each pair maps regions to zones by allocating tracks for regions from outer most zones through to inner most zones. The second disk of each pair maps regions to zones by allocating tracks for zones in the opposite direction, from inner most zones to outer most zones. FIG. 7 is a block diagram of four disk drives (850 through 856) of an exemplary storage system. Two disk drives (850 and 852) are designated as Type A (800) wherein tracks are allocated for regions from outer most zones to inner most zones as indicated by the radial inward arrow 804. The other two disk drives (854 and 856) are designated Type B (802) wherein tracks are allocated for regions in the opposite direction, from inner most zones to outer most zones as indicated by the radial outward arrow 806.

The table below is an exemplary region table (also referred to herein as region map) to logically map regions to zones corresponding to be Seagate Cheetah drive (and the exemplary zone table TABLE 1 presented herein above). The table below describes an exemplary region map for the 4-drive system of FIG. 7 where the Cheetah drive has 8 heads (i.e., 8 tracks per cylinder). As noted above, this particular exemplary region map is not intended to limit the present invention. Rather, the methods and systems of the present invention are usable in association with a wide variety of region to zone mappings. The table provided herein below is therefore intended merely as exemplary of a particular mapping useful in association with the present invention and in association with Seagate Cheetah disk drives and the zone table presented herein above. Further, those skilled in the art will recognize the simple computational derivation of several of the fields of the table. Depending upon computational or storage limits of the controller in which the table is generated and stored, it may be preferred to pre-compute all values and store them in tabular form as indicated below or it may be preferred to reduce the size of the table by computing particular fields as required in the application of the table. Such design choices are well known to those skilled in the art. It will be noted that the table below is split into two section merely for convenience of printing this document. The two sections are in fact a single table in the preferred embodiment.

TABLE 2

(exemplary region map)

| Region | Zones used in region | # tracks in region | Type A disks sectors per track | Type B disks sectors per track | Stripe size in sectors | Sectors in region (strip size * # tracks * 8 heads) |
|---|---|---|---|---|---|---|
| 0 | 0, 6 | 630 | 195 | 131 | 652 | 3286080 |
| 1 | 0, 5 | 672 | 195 | 144 | 678 | 3644928 |

TABLE 2-continued (exemplary region map)

| | | | | | | |
|---|---|---|---|---|---|---|
| 2 | 1, 5 | 60 | 185 | 144 | 658 | 315840 |
| 3 | 1, 4 | 816 | 185 | 153 | 676 | 4412928 |
| 4 | 1, 3 | 270 | 185 | 164 | 698 | 1507680 |
| 5 | 2, 3 | 630 | 176 | 164 | 680 | 3427200 |
| 6 | 2, 2 | 420 | 176 | 176 | 704 | 2365440 |
| 7 | 3, 2 | 630 | 164 | 176 | 680 | 3427200 |
| 8 | 3, 1 | 270 | 164 | 185 | 698 | 1507680 |
| 9 | 4, 1 | 816 | 153 | 185 | 676 | 4412928 |
| 10 | 5, 1 | 60 | 144 | 185 | 658 | 315840 |
| 11 | 5, 0 | 672 | 144 | 195 | 678 | 3644928 |
| 12 | 6, 0 | 630 | 131 | 195 | 652 | 3286080 |

| Lowest LBA in region | Highest LBA in region | # stripes in region | low stripe # in region | high stripe # in region |
|---|---|---|---|---|
| 0 | 3286079 | 5040 | 0 | 5039 |
| 3286080 | 6931007 | 5376 | 5040 | 10415 |
| 6931008 | 7246847 | 480 | 10416 | 10895 |
| 7246848 | 11659775 | 6528 | 10896 | 17423 |
| 11659776 | 13167455 | 2160 | 17424 | 19583 |
| 13167456 | 16594655 | 5040 | 19584 | 24623 |
| 16591656 | 18960095 | 3360 | 24624 | 27983 |
| 18960096 | 22387295 | 5040 | 27984 | 33023 |
| 22387296 | 23894975 | 2160 | 33024 | 35183 |
| 23894976 | 28307903 | 6528 | 35184 | 41711 |
| 28307904 | 28623743 | 480 | 41712 | 42191 |
| 28623744 | 32268671 | 5376 | 42192 | 47567 |
| 32268672 | 35554751 | 5040 | 47568 | 52607 |

MAPPING METHODS: REGION TABLE GENERATION

Figure 3:
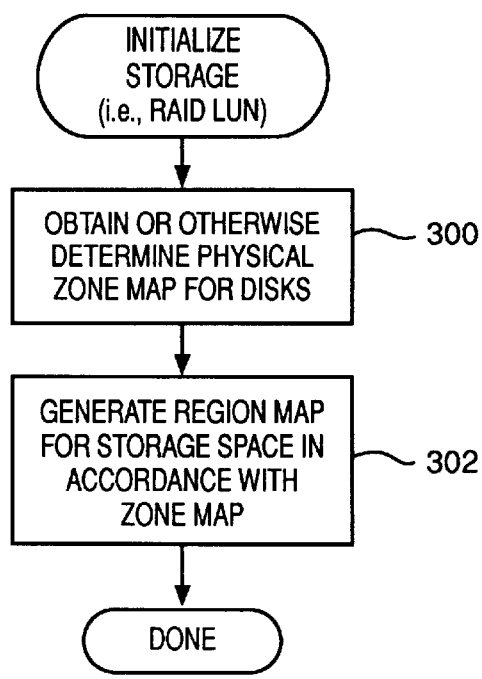
FIG. 3 is a flowchart describing a method of the present invention to generate a region map when a storage system is initialized.

FIG. 3 is a flow chart describing a method of the present invention operable to create a region map (also refer to herein as a region table) such as described above with respect to table 2. As noted elsewhere herein, the region table may be generated dynamically or may be statically defined and stored within the storage subsystem. For example, in RAID storage subsystems it is common to dynamically configure particular logical units (LUNs) for which particular RAID management techniques are applied. In such applications of the present invention, initialization of the storage subsystem (i.e., configuration or initialization of a RAID LUN) may invoke the method of FIG. 3 to dynamically generate the region map for the particular LUN. Alternatively, the region map may be generated once for the entire storage subsystem when the subsystem is initialized at power on.

Element 300 is first operable to obtain or otherwise determined the physical zone map for the disk drives of the storage subsystem. As noted herein above in the preferred embodiment and in the best presently known mode, the physical zone map information is provided by the disk drive manufacturer. The physical zone map so obtained is preferably stored in a memory associate with storage subsystem. As for the region table, the physical zone table may be dynamically generated by the system or statically encoded within the storage system. For example, where the system is intended to be adaptable to wide variety of disk drives from a wide variety of manufacturers, the zone table information would need to be dynamically constructed as particular disk drives are discovered or configured in the system. In the preferred embodiment, the physical zone map is supplied by an administrative user when configuring the storage subsystem. Where multiple disk drive models or manufacturers are to be accommodated, such an administrative user would be responsible for entering physical zone map information for each such disk drive to be accommodated. In an alternate embodiment, physical zone map information may be obtained by inquiry directly from the disk drive itself. Certain to disk drive manufacturers may store such physical zone information on this drives in a reserved configuration area. In still further alternative embodiments, the physical zone information may be determined by testing the disk drives to determine the storage density of each particular track or cylinder of the disk drive. Such density information may be determined by certain lower-level diagnostic functions provided by the disk drive itself. In such a case, element 300 represents processing required to inquire of the disk drive and to execute any diagnostic sequences required of the disk drive to determine the storage density of each track or cylinder and thereby determine the zones of equal density tracks.

Element 302 is then operable to generate the region map for the storage subsystem in accordance with the physical zone map obtained by operation of element 300. As noted above, in the preferred embodiment and best presently known mode of practicing the invention, regions are mapped to zones such that no region overlaps two zones. Details of the preferred method of generating such a map are provided in further detail herein below with reference to FIG. 5.

Figure 4:
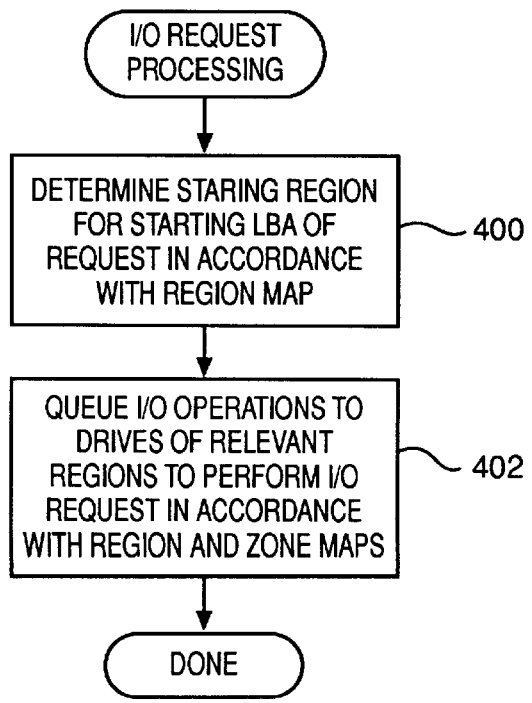
FIG. 4 is a flowchart describing a method of the present invention to process host system I/O requests using the region mapping information of the present invention.

FIG. 4 is a flow chart describing the processing of an I/O request in accordance with the zone table and region table obtained and generated by operation of the method of FIG. 3. In particular, an attached host system generates an I/O request and specifies the region of storage to be manipulated by identifying a starting logical block address (LBA) and a number of sequential blocks to be manipulated (read or written). The method of FIG. 4 utilizes the region map and zone map to perform the requested I/O sequence and such a manner as to assure substantially average sustained performance regardless of physical location of the blocks to be manipulated.

MAPPING METHODS: I/O REQUEST MAPPING

Element 400 is first operable to determine from the provided starting LBA which region contains the starting block. This determination is made via inquiry to the region table created by operation of the method of FIG. 3. In particular, the region map as exemplified by table 2 above is inspected sequentially until the region containing the specified starting LBA is identified. Those skilled in the art will readily recognize that where are the region map contains a large number of regions, well-known fast search techniques (i.e., binary search) may be utilized to effectuate the search of the region map. In the preferred embodiment, the number of regions is relatively small (i.e., on the order of the number of zones contained in the disk drives. Therefore, complex rapid search techniques provide little or no added benefit as compared to their added complexity in processing each I/O request.

Element 402 is then operable to queue low-level I/O operations (i.e., read and write operations) to all disk drives of the relevant regions in accordance with the region and zone maps created by operation of the method of FIG. 3. Specifically, the number of blocks and the starting block for you each disk drive is determined by operation of element 400. In addition, a particular I/O request may overlap multiple regions of the disk drives. Therefore, element 402 represents all processing necessary to effectuate completion of the I/O request where such a request overlaps multiple regions of the drives.

Details of the operation of element 400 are provided herein below with respective FIGS. 6.

Figure 5:
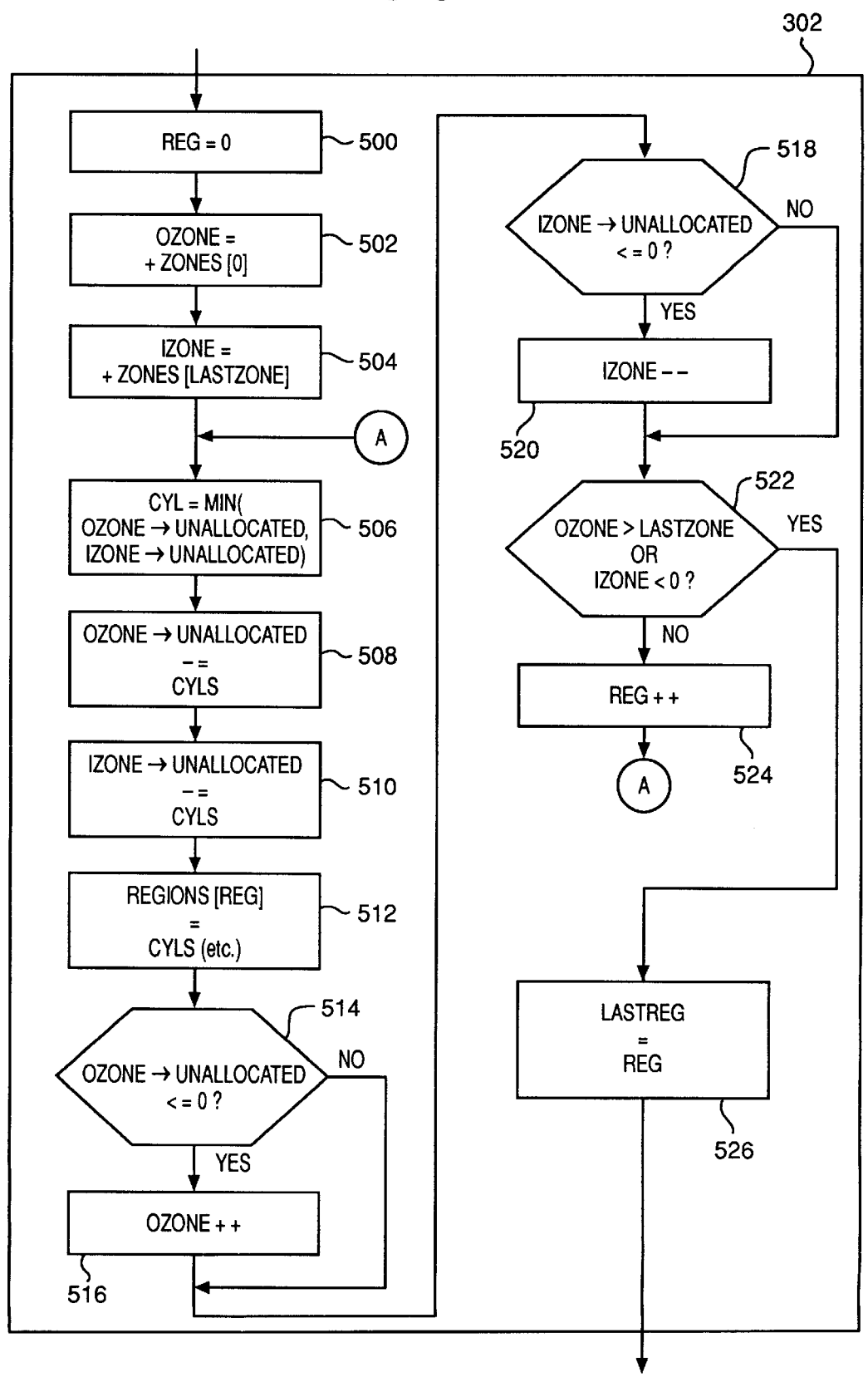
FIG. 5 is a flowchart providing additional details of the method of FIG. 3.

FIG. 5 is a flow chart describing additional details of the operation of element 302 of FIG. 3. Element 302 of FIG. 3 is generally operable to generate the region map (region table) from the information provided in the zone table. As noted above, the zone table is preferably provided by the disk drive manufacturer and dynamically entered, or statically stored, in a memory associated with the storage subsystem. Further, as noted above, the processing of element 302 to generate the region table may be performed when the storage subsystem is initialized. In the preferred embodiment however, the storage subsystem utilizes RAID storage management techniques and the region table is dynamically generated in response to configuration, reconfiguration, and disk drive swaps within the RAID storage subsystem.

Element 500 is first operable to set a local index variable REG to zero. Element 502 is then operable to set a local pointer variable OZONE to point at the first entry of the zone table (i.e., corresponding to outer most zone 0). Element 504 is then operable to set a local pointer variable IZONE to point at the last zone in the zone table (i.e., the last or inner most zone of the disk drives). Element 506 is then operable to determine the number of cylinders (tracks) to be allocated in the present region being defined (i.e., the first region on the first iteration of element 506).

Specifically, in the preferred embodiment, the number of cylinders to be allocated is determined as the minimum of the number of unallocated cylinders in the present outer most zone the (pointed to buy OZONE) and the number of unallocated cylinders in the inner most zone (presently pointed to buy IZONE). By determining the minimum of the two values, it is assured that the region presently being defined will not overlap two zones. Further, those skilled in the art will readily recognize that the specific cylinders to be allocated from the zone are the outer most cylinders remaining for the outer zone (OZONE) cylinders allocated, and the inner most cylinders remaining for the inner most zone (IZONE). Those skilled in the art world furthermore recognize that the methods and structures of the present invention are applicable to a wide variety of cylinder, track, and sector allocations in addition to that described herein with respect element 506. The processing of element 506 is therefore intended as exemplary of the preferred embodiment and best presently known mode of practicing the invention.

Elements 508 and 510 are then operable to decrement the count of all unallocated cylinders remaining in the present outer most zone being utilized and the corresponding count of unallocated cylinders in the present inner zone being utilized, respectively.

Element 512 is then operable to set the configured values into the region map entry presently being defined. The configured values include the number of cylinders allocated and other information as described above with respect to exemplary table 2. As noted above with respect to table 2, many of the table fields are derived by simple calculations from the number of cylinders allocated and other parameters of the disks (sectors per tracks for each type of drive, number of heads, number of drives, etc.). Such values are preferably pre-computed and entered as fields in the region map.

Elements 514 through 520 are next operable to determine if the cylinders just allocated exhausted either the outer most zone or the inner most zone presently being utilized to define a region. Specifically, element 514 is first operable to determine if the count of unallocated cylinders in the outer most zone pointed to buy the OZONE parameter has been decremented to zero. If so, element 516 is next operable to increment local pointer variable OZONE to point at the next outer most zone. In both cases, processing continues with element 518 to determine whether the count of unallocated cylinders in the presently utilized inner most zone (pointed to buy the IZONE variable) has been decremented to zero. If so, element 520 is next operable to increment to decrement the local pointer variable IZONE pointing at the presently utilized inner most zone. In both cases, processing continues with element 522.

Element 522 is operable to determine whether all zones have been fully utilize in defining regions. In particular, element 522 tests whether the local pointer variable OZONE has been incremented past the last defined zone or whether the local pointer variable IZONE has been decremented below zero. In either case, processing terminates with element 526 to set a local configuration variable indicative of the last region defined by the processing of element 302. Where element 522 determines that more regions may yet be defined, element 524 is operable to increment the local index variable REG to the next region for definition. Processing then continues by looping back to element 506 (indicated as label A in FIG. 5). Elements 506 through 524 are therefore iteratively operable to define all regions and generate entries corresponding to those regions in the region map.

Figure 6:
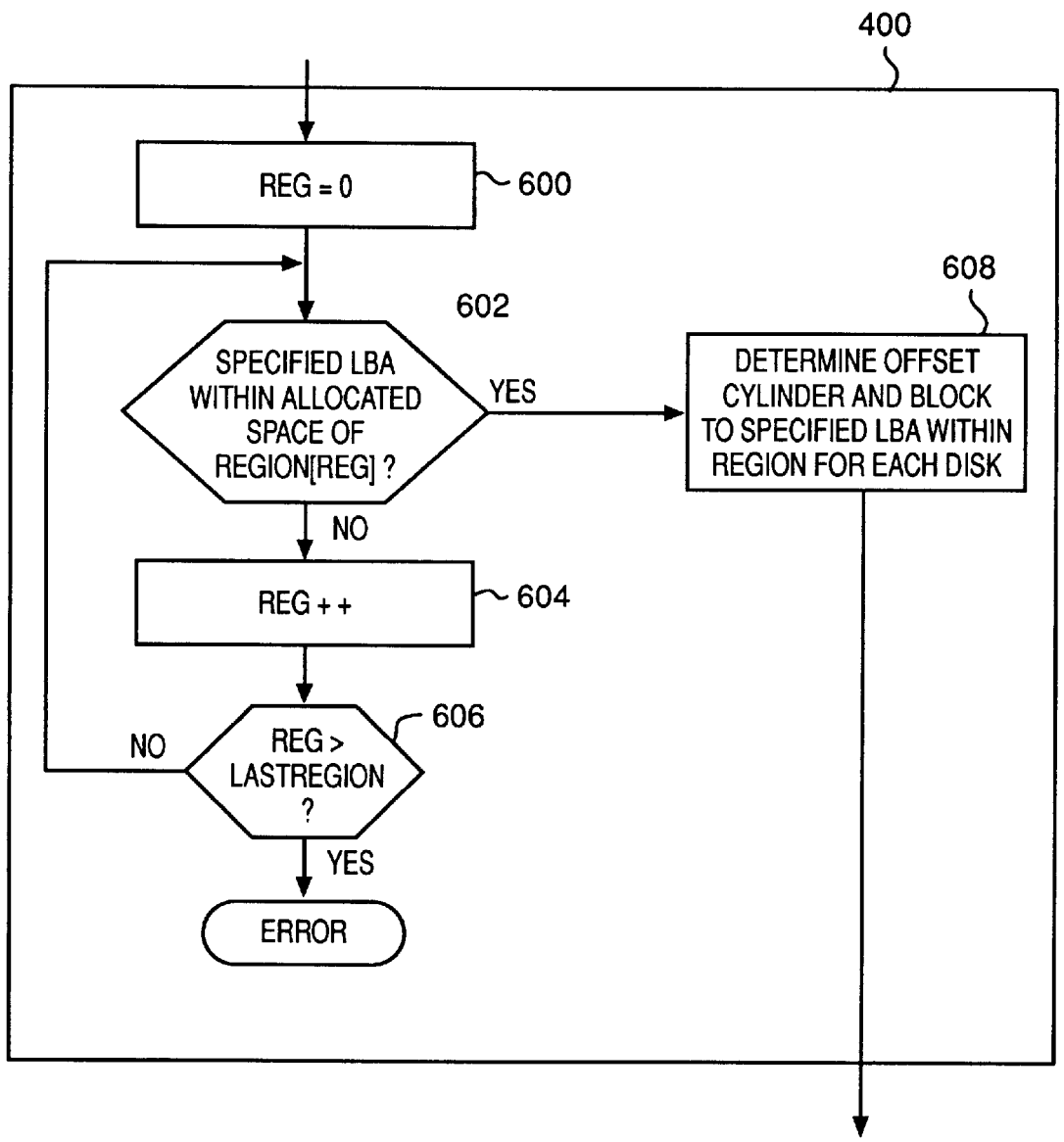
FIG. 6 is a flowchart providing additional details of the method of FIG. 4.

FIG. 6 is a flow chart describing in further detail the operation element 400 of FIG. 4. In general, element 400 of FIG. 4 is operable to determine which region contains the starting blocks requested in the 110 request received from an attached host system. The determination is made by inspecting the region map to determine which region contains the starting blocks specified in the I/O request. Once so determined, other parameters required for initiating low-level 110 operations are determined from the entry in the region map which contains the specified blocks.

Element 600 is first operable to set in local index variable index REG to zero. Elements 602 through 606 are then iteratively operable to search each entry of the region map to locate the entry which contains the starting block of the I/O request.

The region map includes details for both types of disk drive. So called type A and type B drives are in the table entry for each region. The processing of FIG. 6 therefore inspects the region map entry based upon the type of the drive being processed. As noted above, half the disks are of a first type (i.e., mapped from outer zones to inner zones) and the other half of the second type (i.e., mapped from inner zones to outer zones). A disk drive's type is preferably easily determined by its drive number. For example, all even numbered drives may be deemed type A and all odd numbered drives may be deemed type B. Or a first half may be type A and a second half type B. Those skilled in the art will recognize the equivalence of a variety of subsets of the disks to define first and second types of drives. The present invention requires only that a first portion be mapped from outer zones to inner zones and a second portion be mapped from inner zones to outer zones.

In the preferred embodiment, each portion of drives represents substantially half of the drives. Those skilled in the art will note that different degrees of sustained performance consistency may be achieved by dividing the drives in portions other than half. In particular, for certain disk drives, the zone mapping may include a larger number of low performance tracks as compared to higher performance tracks. In such situations, it may be optimal to divide the drives into unequal sized groups of drive types. Or for example, it may be desirable to define more that two drive types. All such variants are to be considered within the scope of the present invention.

Element 602 is operable to test whether the region entry pointed to by the current value of the index variable REG contains the specified starting logical block (LBA). If not, processing continues with element 604 to increment the local index variable REG. Element 606 than determines if the index variable REG has been increment past the last region defined in the region map. If not, processing continues by looping back to element 602 to inspect a next entry of the region map. When element 602 eventually determines that the desired region has been found, element 608 is operable to complete processing by determining appropriate offset values within the region cylinders and blocks to the specified starting block of the I/O request. Specifically, the starting cylinder and blocks for each disk in the disk array is determined by operation of element 608.

Those skilled in the art will recognize that the sequential search described by the method of FIG. 6 is adequate where are the number of entries in the region map is small. As noted above, where a large number of regions are defined, rapid search techniques such as binary searching may be used to speed the processing required to search the map for each I/O request. In the best presently known mode of practicing the invention such rapid search techniques are not required because the number of regions typically defined is small (i.e., on the order of the number of physical zones defined in the disk drives).

The methods and structure of the present invention are applicable to RAID and non-RAID storage systems. In non-RAID storage applications, data may be streamed to the storage subsystem for file storage or merely streamed to sequential blocks of the storage system without any file system overhead applied thereto. Such applications could include imaging applications or other video data capture or high speed data acquisition applications. In such applications, the storage system is typically viewed by the host system as a single large vector of storage blocks sequentially numbered with logical block addresses (LBAs) ranging from zero to the number of blocks on the system. As noted above, a region includes a portion (a segment) from each disk in the array where approximately half the drives are mapped from outer zones to inner zones while the other half is mapped from inner to outer. Each portion (segment) of a region on a disk stores a number of logical blocks in this sequential LBA range. The region map information is therefore used to simply map a linear LBA space to particular blocks, tracks/cylinders, and segments in the appropriate zones of the disks so as to achieve the desired consistent sustained performance.

Where the present invention is applied in conjunction with RAID storage management, the region table information is used to map blocks within a specific logical unit (LUN) of the RAID disk array. In most RAID management techniques, a disk array may be configured to have multiple LUNs. Each LUN may be configured for a particular level of RAID management and storage capacity. Each LUN is viewed by the host systems as a separate storage device having a linear address space of logical block addresses from zero through the number of blocks in the LUN.

The I/O request processing which uses the region tables may be further understood with reference to the following computational descriptions. Using the information in the region map, the stripe containing a particular LBA cab be identified as:

stripe_address=(beginning_stripe_address_in_region)+quotient((LBA−beginning_LBA_in_region)/stripe_size_in_region)

The first LBA belonging to that stripe can be identified as:

first_LBA_in_stripe=((stripe_address)−(lowest_stripe_in_region))*(stripe_size_in_region)

The sector/block displacement within the stripe is then determined as:

sector_displacement_within_stripe=LBA−first_LBA_in_stripe

From this displacement value and the segment size entries for the region, the disk segment and disk number can be identified and the sector displacement on that disk can be computed. The starting segment address of a stripe within a RAID LUN is simply the stripe address time the number of disks in the LUN (stripe). However, the segment address is not relevant in this computational algorithm because the region table contains enough information about stripes and stripe sizes that the disk and disk address can be derived without a segment mapping. Since the stripe's first LBA (in LUN relative logical block address units) can be computed, the first LBA (in physical disk units) of each stripe can be computed. It is simply the quotient of the stripe's first LBA (in LUN relative units) divided by the number of disks. This value also represents the first LBA of each segment in the stripe. From this value and the segment size entries for the region, the actual disk representing the segment can be computed. The LBA on that disk can also be computed from the region map entries.

As noted above, more or less data may be pre-computed and stored in the region map. Where less data is so pre-computed, the table requires less storage space at the cost of computational complexity associated with processing of each I/O request. Conversely, where more data is pre-computed and stored in the region table, the computational complexity is reduced for each I/O request at the cost of additional storage space for the region table. Such design choices are well known to those skilled in the art.

ALTERNATE EMBODIMENTS

Figure 8:
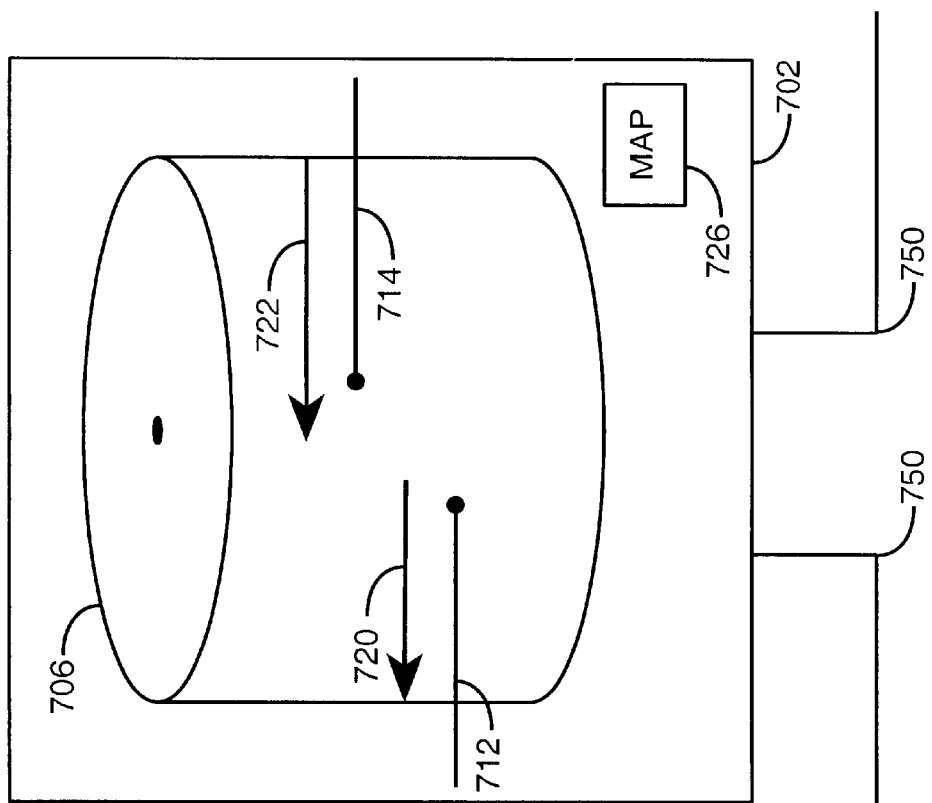
FIG. 8 is a block diagram depicting alternative embodiments of the present invention.
Figure 8:
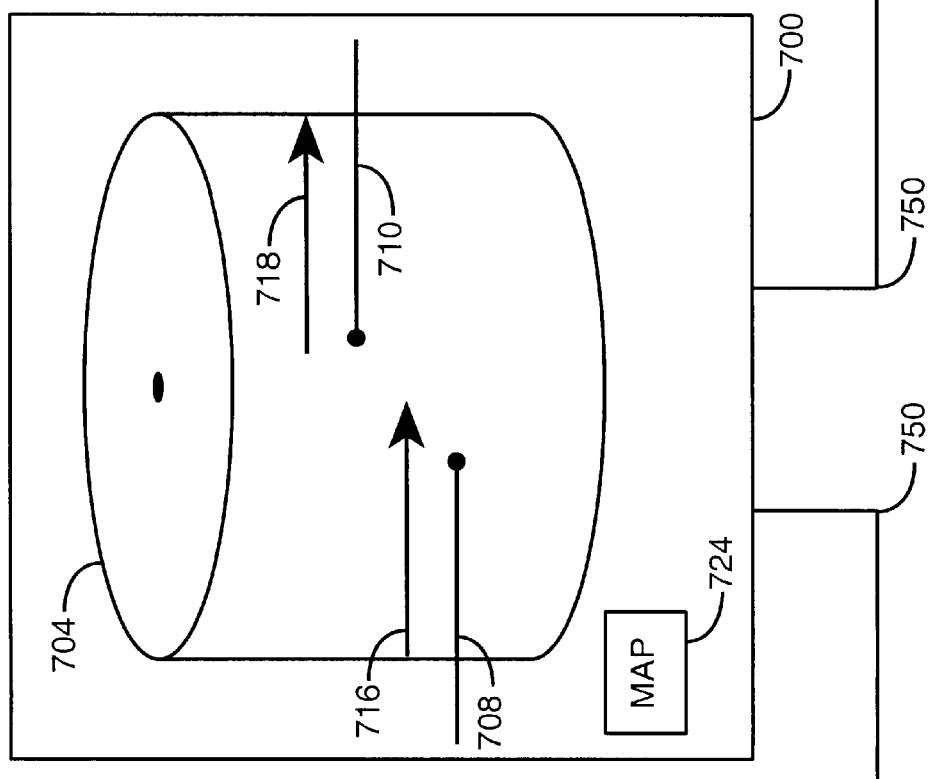

FIG. 8 is a block diagram depicting alternate embodiments of the structures and methods of the present invention. Specifically, FIG. 8 shows a single disk drive (a disk spindle) 700 having multiple, independently operable actuators 708 and 710 manipulating information on storage medium 704. Since the actuators 708 and 710 are independently operable, one actuator 708 is operable to map sequential locations from outer zones to inner zones as indicated by inward arrow 716. The second actuator is operable to map sequential locations on the disk spindle from inner zones to outer zones as indicated by outward arrow 718. Each actuator 708 and 710 may be independently operable manipulating regions in different zones. The regions are therefore used in a striped fashion as described herein above to permit simultaneous I/O operation through two (or more) actuators.

Such an embodiment achieves similar goals of improving consistency of performance by combining higher performance regions with lower performance regions, each on separate actuators, to provide for consistent "average" sustained performance.

Also shown in FIG. 8 is an embodiment in which multiple disks 700 and 702 perform such region to zone mapping locally in drive control electronics. As shown in FIG. 8, disks 700 and 702 are substantially similar. Disk 702 includes multiple actuators 712 and 714 mapped in opposing radial directions as indicated by arrows 720 and 722 to manipulate information on recording surface 706. Though shown with multiple actuators, this second alternate embodiment does not require such multiple actuators but rather is operable on more typical single actuator disk spindles.

However, disks 700 and 702 both contain local region maps 724 and 726, respectively. The mapping of blocks to regions to physical zones is therefore performed within the drive control electronics rather than by a subsystem controller. A subsystem controller or host system therefore uses the disks 700 and 702 in a manner which stripes data over the disks but remains transparent in terms of the zone mapping performed to enhance the consistency of the subsystem performance.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A disk mapping method comprising the steps of:
   generating a region map, wherein said region map includes information regarding each region of a plurality of regions, wherein said each region includes a portion of each disk of said plurality of disks, wherein said portion is allocated on substantially half of said disks sequentially according to a radial position attribute indicia from outermost to innermost and is allocated on substantially half of said disks sequentially according to said radial position attribute indicia from innermost to outermost; and
   mapping I/O requests for sequential blocks from an attached host system in accordance with said region map to provide substantially consistent sustained I/O performance for large I/O operations in the storage subsystem.

2. The method of claim 1 wherein the step of generating includes the steps of:
   a) defining a new region of said plurality of regions as an allocated number of cylinders from a first zone in a first portion of said plurality of disks and an equal number of cylinders from a second zone in a second portion of said plurality of disks;
   b) adding an entry to said region map having information about said new region; and
   repeating steps a) and b) to define said plurality of regions until all cylinders are allocated in one region of said plurality regions.

3. The method of claim 2 wherein the step of defining includes the steps of:
   c) allocating a number of cylinders from a first zone of a first disk of a pair of disks of said plurality of disks;
   d) allocating an equal number of cylinders from a second zone of a second disk of a pair of disks of said plurality of disks wherein said second zone is positioned on said second disk radially opposite the position of said first zone on said first disk; and repeating steps c) and d) for each pair of disks of said plurality of disks.

4. The method of claim 3 wherein the step of allocating a number of cylinder comprises the step of:
   allocating said number of cylinders as the lesser of the number of unallocated cylinders in said first zone and the number of unallocated cylinders in said second zone.

5. The method of claim 1 wherein the step of mapping includes the step of:
   determining the number of sequential blocks to be processed on each disk of said plurality of disks in accordance with said region map; and
   determining the starting block on each disk of said plurality of disks for processing of said I/O request in accordance with said region map.

6. The method of claim 5 further comprising the step of:
   queuing a number of I/O operations to each disk of said plurality of disks in accordance with said region map.

7. The method of claim 1 wherein said storage subsystem is a RAID subsystem having at least one logical unit defined therein and wherein the step of generating is performed when said logical unit is configured in said RAID subsystem.

8. The method of claim 1 wherein the step of generating is performed at manufacture of said storage subsystem.

9. A system for mapping host supplied logical addresses to physical disk locations comprising:
   a memory;
   a region map table stored in said memory wherein each entry of said region map table defines a region on said plurality of disks and wherein each said region has first space allocated in a first radial position of a portion of said plurality of disks and second space allocated in a second radial position of said plurality of disks wherein said second radial position is substantially radially opposite said first radial position; and
   means for mapping sequential logical addresses in host I/O requests received from an attached host system into physical locations in sequential regions on said plurality of disks in accordance with said region map table map to provide substantially consistent sustained I/O performance for large I/O operations in the storage subsystem.

10. The system of claim 9 further comprising generation means for generating said region map table.

11. The system of claim 10 wherein said storage subsystem is a RAID subsystem having at least one logical unit defined therein and wherein said generation means is operable in response to configuration of said logical unit.

12. A program storage device readable by a computer, tangibly embodying a program or instructions executable by the computer to perform the method steps for disk mapping to achieve substantially consistent sustained performance, said method steps comprising:

generating a region map, wherein said region map includes information regarding each region of a plurality of regions, wherein said each region includes a portion of each disk of said plurality of disks, wherein said portion is allocated on substantially half of said disks sequentially according to a radial position attribute indicia from outermost to innermost and is allocated on substantially half of said disks sequentially according to said radial position attribute indicia from innermost to outermost; and mapping I/O requests for sequential blocks from an attached host system in accordance with said region map to provide substantially consistent sustained I/O performance for large I/O operations in the storage subsystem.

13. The program storage device of claim 12 wherein the method step of generating includes the steps of:

a) defining a new region of said plurality of regions as an allocated number of cylinders from a first zone in a first portion of said plurality of disks and an equal number of cylinders from a second zone in a second portion of said plurality of disks;

b) adding an entry to said region map having information about said new region; and repeating steps a) and b) to define said plurality of regions until all cylinders are allocated in one region of said plurality regions.

14. The program storage device of claim 13 wherein the method step of defining includes the steps of:

c) allocating a number of cylinders from a first zone of a first disk of a pair of disks of said plurality of disks;

d) allocating an equal number of cylinders from a second zone of a second disk of a pair of disks of said plurality of disks wherein said second zone is positioned on said second disk radially opposite the position of said first zone on said first disk; and repeating steps c) and d) for each pair of disks of said plurality of disks.

15. The program storage device of claim 14 wherein the method step of allocating a number of cylinder comprises the step of:

allocating said number of cylinders as the lesser of the number of unallocated cylinders in said first zone and the number of unallocated cylinders in said second zone.

16. The program storage device of claim 12 wherein the method step of mapping includes the step of:

determining the number of sequential blocks to be processed on each disk of said plurality of disks in accordance with said region map; and determining the starting block on each disk of said plurality of disks for processing of said I/O request in accordance with said region map.

17. The program storage device of claim 16 further comprising the step of: queuing a number of I/O operations to each disk of said plurality of disks in accordance with said region map.

18. The program storage device of claim 12 wherein said storage subsystem is a RAID subsystem having at least one logical unit defined therein and wherein the method step of generating is performed when said logical unit is configured in said RAID subsystem.

19. The program storage device of claim 12 wherein the method step of generating is performed at manufacture of said storage subsystem.

* * * * *